United States Patent [19]
Martin

[11] Patent Number: 5,497,717
[45] Date of Patent: Mar. 12, 1996

[54] FURROW CLOSING DEVICE

[76] Inventor: Howard Martin, 169 Allegre Rd., Elkton, Ky. 42220

[21] Appl. No.: 154,975

[22] Filed: Nov. 19, 1993

[51] Int. Cl.⁶ ..................................................... A01C 5/04
[52] U.S. Cl. ........................... 111/191; 111/140; 172/230; 172/540
[58] Field of Search .............................. 111/52, 139, 140, 111/141, 149, 167, 191; 172/190, 191, 540, 542, 548, 549, 550, 556, 742, 605, 744, 504

[56] References Cited

U.S. PATENT DOCUMENTS

| | | | |
|---|---|---|---|
| 3,742,877 | 7/1973 | Coffee | 111/191 X |
| 4,258,635 | 3/1981 | Lutz et al. | 111/52 |
| 4,550,122 | 10/1985 | David et al. | 111/140 X |
| 4,785,890 | 11/1988 | Martin | 172/29 |
| 5,129,282 | 7/1992 | Bassett et al. | 172/99 X |
| 5,181,476 | 1/1993 | Rau et al. | 111/52 X |
| 5,190,112 | 3/1993 | Johnston et al. | 172/551 X |
| 5,341,754 | 8/1994 | Winterton | 111/139 |
| 5,346,020 | 9/1994 | Bassett | 172/604 X |
| 5,349,911 | 9/1994 | Holst et al. | 111/139 |

Primary Examiner—Terry Lee Melius
Assistant Examiner—Robert Pezzuto
Attorney, Agent, or Firm—Rockey, Rifkin & Ryther

[57] ABSTRACT

A seed furrow closing device for planting units including a plurality of closing wheels, each wheel having a plurality of sharpened teeth on the periphery. The closing wheels canted at an angle to the vertical and press toward the seeds in the furrow.

The teeth, controlled by down pressure mechanism, penetrate the soil to till compacted soil and firm loose soil to improve germination and emergence. The sharpened teeth interact with the soil to remove residue from the teeth as the teeth emerge. The penetration of the teeth helps break up clods and also stabilizes the rear of the planting unit.

A trailing press wheel over the furrow may provide intermittent compacting of the soil loosened by the closing wheels over the center of the furrow.

This loosening and compaction by the sharpened toothed wheels improves the germination and emergence of the seeds in the furrow.

17 Claims, 3 Drawing Sheets

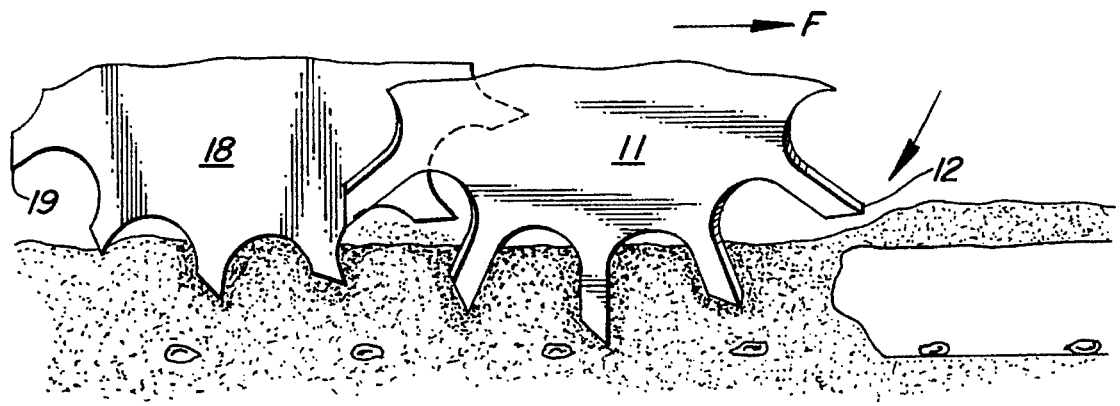
Fig. 4
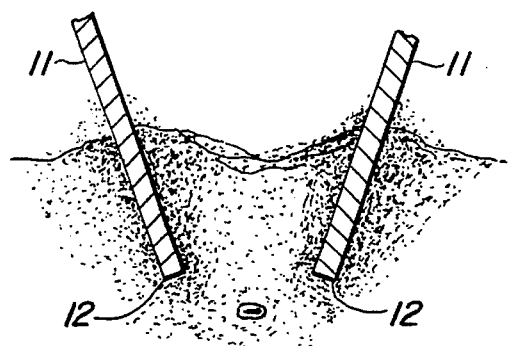
Fig. 5
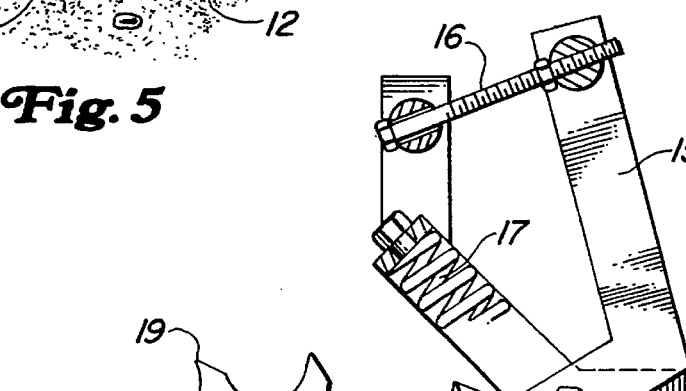
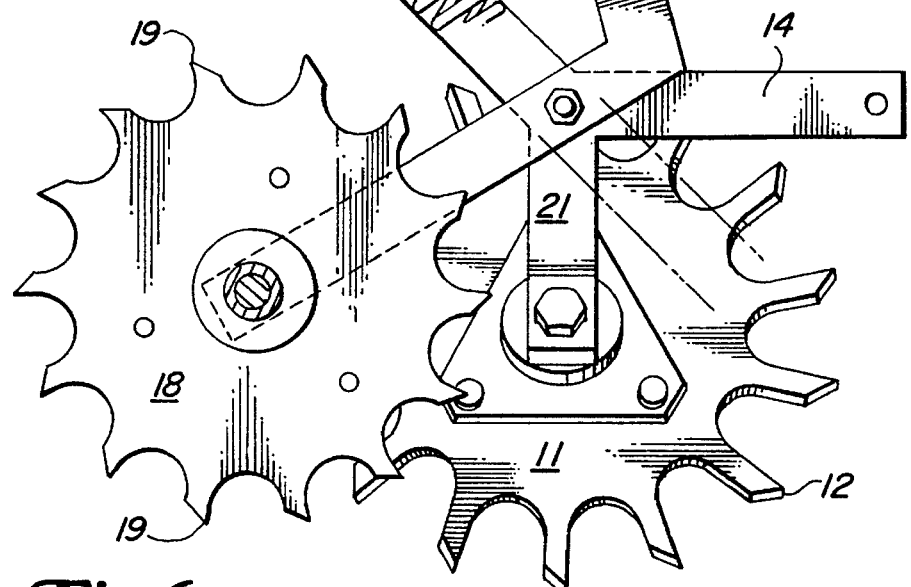
Fig. 6

FURROW CLOSING DEVICE

BACKGROUND OF THE INVENTION

1) Field of the Invention

Present invention relates generally to seeding implements such as planters and drills and to the devices for closing the seed trench behind seed planters and seed drills.

2) Related Art

Proper seed placement in the furrows opened for the seeds by grain drills and planters has been the subject of many inventions. The closing devices for closing the furrows or trenches have not been the subject of much change and consist of mainly round wheels which are of smooth contour and generally made of rubber or steel. These wheels have generally been placed at an angle to the furrow and have tried to push the soil from the side and move the soil back to close the furrow by pressure. The squeezing action of the seed trench opening discs produces a very tightly compacted side wall which is under normal circumstances pressured by the closing wheels to close the furrow. The pressure on the tightly compacted soil causes further compaction with resultant poor germination and emergence.

The normal smooth closing wheels are not engaged in the soil and on slopes or contour may shift into either a position in the trench or sufficiently removed from the seed trench that inadequate furrow closing results.

Various devices have recently been devised to attempt to improve the closing of the seed trench. This includes a tined or spoked wheel configuration which is designed to be an improvement over the smooth wheels. These spoked wheels have been fitted to planters to replace the smooth round closing wheels. The prior art closing, spoked or tined wheels operate to apply alternate pressure to the soil in a manner similar to the round wheels, but do not have as much pressure applied. The tined wheels are arranged to operate so that the tines are in the least aggressive position with regard to the soil near the seed furrow trench. The tines are designed in this mode not to penetrate the soil, but rather to kick or flip out the back any trash that may be left on the surface. The design of these prior art wheels is such that when operated in a mode opposite the hoeing mode they have an action similar to a raking motion. The tines cause a very shallow disturbance of the soil as the wheels rotate.

Prior closing devices for seed furrow trenches have always been designed so that they will not cultivate the soil near the seed because of fear of moving the seed rather than covering the seed. These devices have been designed to close the furrow either by pressure or by shallow disturbance of the soil to create a covering of the soil over the seed.

Although providing some improvement in crop emergence these devices have not provided the elimination of compaction of the soil around the seed or provided adequate penetration above the seed. The compacted side wail of the trench formed by the disc opener and closed by smooth wheels can result in hardened soil surfaces either with rainfall or without rainfall. The seed is not under the ideal germination conditions, i.e. firmly placed in soil at proper depth with well mulched soil around it to permit its proper emergence regardless of whether or not there is rainfall. This is particularly true in minimum tillage, high residue operations in which the closing device of this invention operates most efficiently.

BRIEF SUMMARY OF THE INVENTION

It is therefore an object of the present invention to provide an improved closing device for planters which results in optimum seed germination and emergence. It is a further object of this invention to provide a seed furrow closing device for improving seed germination and emergence by thorough tilling and mulching of the soil above the seed depth. It is another object of this invention to provide a furrow closing device which is adjustable so that it will properly close the furrows against and over seeds planted at any depth while still performing a tilling function.

It is another object of the invention to provide a furrow closing device for tilling the soil of compacted sides of the furrow thus reducing the compaction caused by the disc openers. Another object of the invention is to provide an improved furrow closing device including a novel trailing press wheel to further improve the mulching or tilling of the soil over the seed in the furrow and the resultant improved germination and emergence of the seed.

A seed or a furrow closing device constructed according to the teachings of the present invention is fabricated from metal wheels with teeth around the periphery. The teeth have sloping peripheral or end surfaces to provide sharp points and cutting surface to penetrate the soil and to prevent residue from being impaled upon them thereby being cleaned by themselves. The novel closing wheels are attached to the planting device with an arm that has an adjustable spring with enough tension capability to force the teeth into the soil to their maximum depth or the maximum depth of the seed furrow. The closing wheels will normally be placed near the furrow on the current closing device arms of planters which employ smooth press wheels.

As the wheels are rotated by the forward movement of the tractor, the teeth rotate down into the soil to variable depths but basically to a depth slightly above the depth of seed in the furrow. The closing wheels are angled toward the furrow to push and till the soil in from the side and toward the bottom of the trench. As the penetrating teeth rotate out of the soil, the soil above the seed is loosened. This includes any soil compacted into side wall by the disc opener.

In loose soil the penetrating teeth of this invention will breakup any clods in the row area and tamp or push the loose soil toward the bottom of the seed trench. As the teeth rotate upward they permit the finer soil particles to drop down toward the seed which aids in elimination of air pockets. In all soil conditions the operation of penetrating teeth will cause mulching or loosening of the soil in, around and above the seed providing optimum conditions for the germination and emergence of the seed.

A further object of the invention is that the said penetrating teeth serve to stabilize the rear of the planter unit because of operating in the soil. Thus it is possible to maintain a consistent distance of the closing wheels from the seed trench when operating even on side hills or contours.

A penetrating trailing press wheel may also be provided which rolls inside the circumference of the closing wheel and over the seed furrow and to capture the soil that has been rotated upwardly by the penetrating closing wheels. The press wheel can also be adjusted for depth of penetration to regulate the amount of loose soil that is provided by the penetrating closing wheels. The press wheel may be lowered to its maximum penetration when the soil is dry to more firmly compact the soil and prevent air pockets. The press wheel may be raised to no penetration in wet soil conditions to retain the loosened soil in its uncompacted condition. The trailing press wheel has sharpened penetrating teeth thereby providing intermittent firming of the soil which provides an easier exit for the seed.

BRIEF DESCRIPTION OF THE DRAWINGS

FIG. 4 is a side view showing the novel furrow closing device of this invention operating in soil.

FIG. 5 is rear view of the side wheels of the closing device of this invention depicting the seed and soil after the closing device has operated.

FIG. 6 is a side view of the closing device of this invention showing the trailing press wheel adjusted to its minimum depth for operation.

DETAILED DESCRIPTION OF THE DRAWINGS

Figure 1:
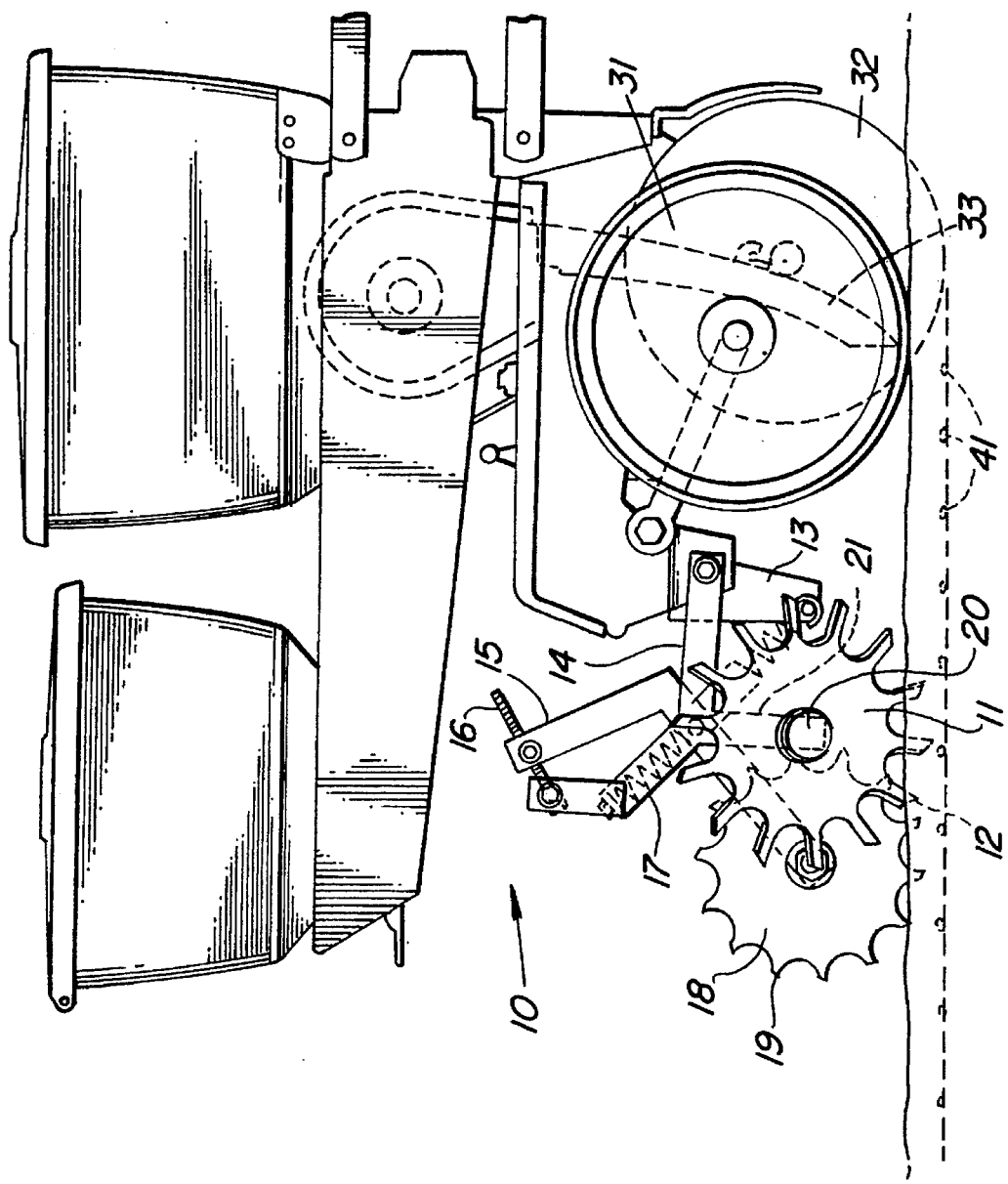
FIG. 1 is a side view of a planting unit including the seed boxes, seed tubes, furrow openers and novel closing device of this invention.
Figure 2:
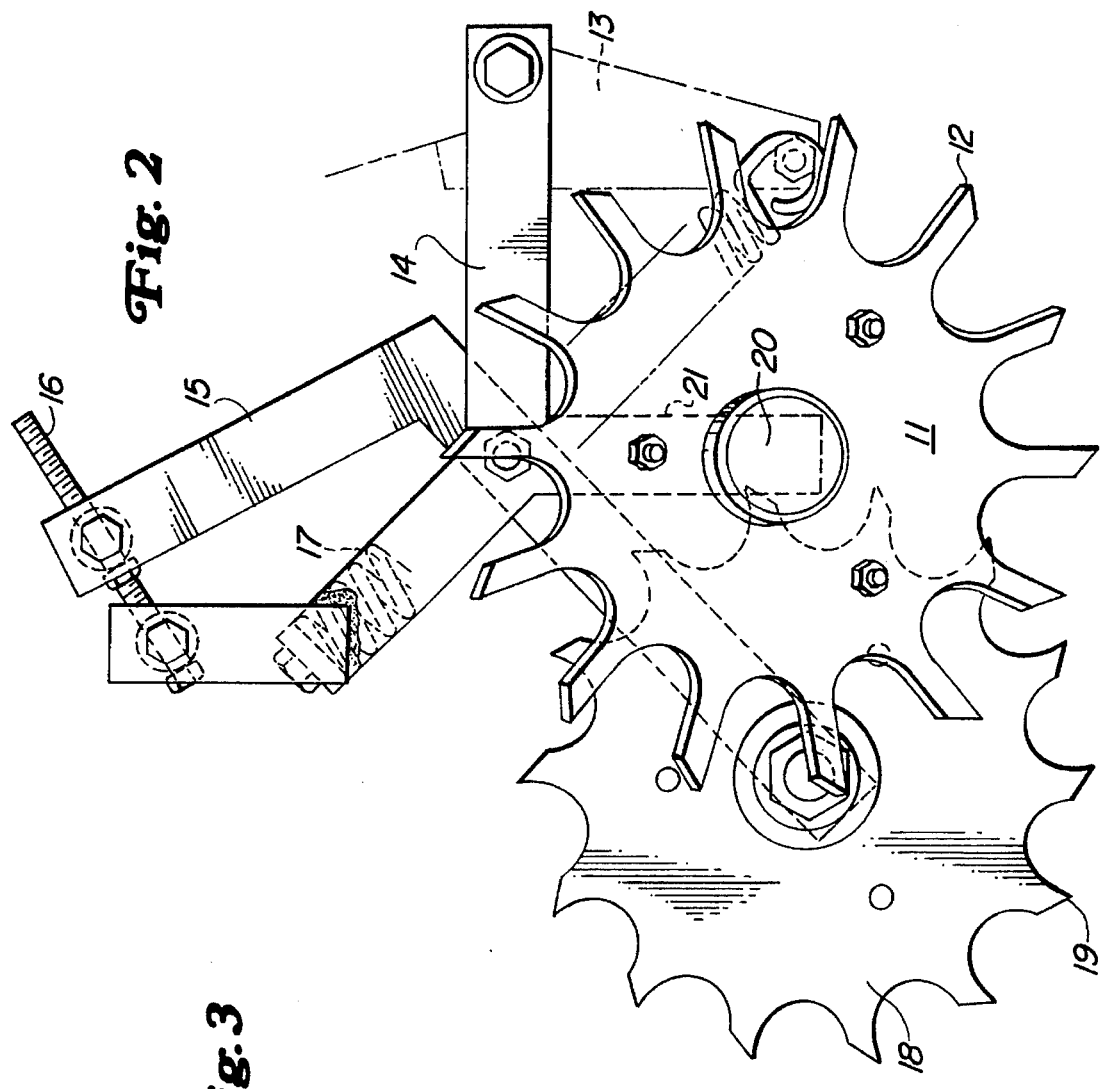
FIG. 2 is an enlarged side view of the furrow closing device of this invention.
Figure 3:
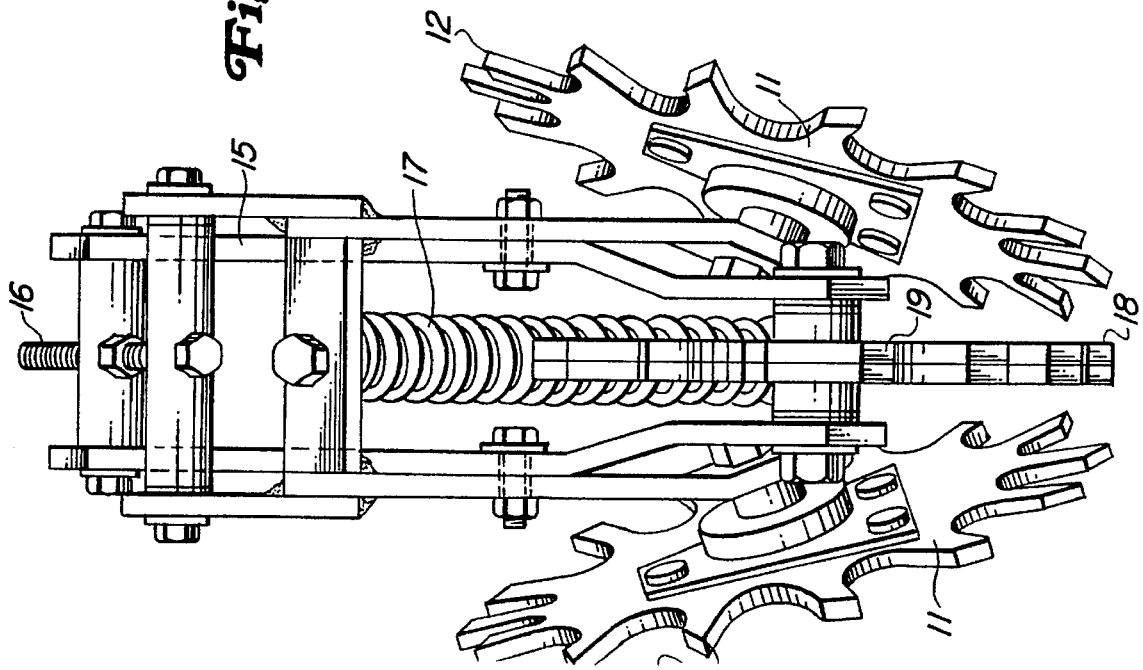
FIG. 3 is an enlarged rear view of the furrow closing device of this invention.

Referring now to FIG. 1, there is shown a planter unit 10 including the seed tube 33, the disc openers 32 and the depth measuring wheels 31. The planting unit is designed for forward movement to the right on the drawing across the field. Seeds 41 are shown in the furrow created by the furrow opening device shown as 31 and 32. A down pressure assembly biases the opener disc 32 into the soil to open the furrow and the depth adjustment wheel 31 is controlled by an adjustment mechanism not shown. This control is well known in the art and moves the axis of the wheel 31 vertically with respect to the disc 32.

The novel furrow closing device of this invention includes firming, soil loosening closing wheels 11 which have plurality of sharpened teeth 12 around it periphery. A trailing press wheel 18 which may follow in the center of the furrow and is located between the closing or press wheels 11 has a plurality of teeth 19 around its perimeter. The furrow closing device of this invention is supported from the frame 13 of the planter unit 10 by the support member 14. This support member 14 is attached to the upper part of the member 13. Member 21 is suspended from support member 14 and supports the bearing members and axle members 20 about which the process wheels rotate. The firming or closing wheels 11 and the firming and closing wheel force applied to the wheels may be adjusted by down pressure spring assembly 17. The spring pressure will determine the depth to which the closing wheels 11 are forced into the ground. This depth will vary according to the planting depth and be adjusted similarly to the down pressure assembly on the opening device.

The penetrating closing wheels have a plurality of teeth which are sharpened and are sloped at an angle of 45° from the entering edge to the trailing edge of the tooth as it enters the soil. This sloping and sharpened cutting edge results in penetration and resultant tillage of the soil and also in the residue being forced by the soil from the trailing edge as the tooth emerges from the soil. This eliminates the problem of residue accumulating upon penetrating teeth in no till conditions. The press wheels are made of sturdy metal usually steel because of the operation of plowing or tilling the soil. The wheels must be strong and wear-resistant.

In one preferred embodiment the press wheels were 13 inches in diameter with the length of the teeth being 2½ inches. The surface of the wheel between teeth should be circular in nature to prevent dirt from sticking to the area between the teeth. The penetrating wheel may be cut similarly to a gear except that the sharpened edge tooth 12 is different from a gear tooth. In the preferred embodiment the teeth 12 were 14 in number and the closing wheels 11 were tilted from the vertical at an angle of 20°.

The wheels 11 are attached to an arm which is attached to the planting assembly and has an adjustable spring member 17 which at its maximum tension has the ability to force the teeth 12 into the soil to the maximum depth of the teeth or 2½ inches in the case of the preferred embodiment. The bottom of the teeth as the closing wheels are in operation is 1 inch from the side of the bottom of the trench.

In operation the teeth 12 rotate down into the soil with the cutting edge 12a cutting through the soil and the trailing edge of the cutting edge 12b following. As shown in FIG. 4, this results in the loosening of the soil and yet the firming of the soil from the sides toward the seed as it was deposited in the furrow. In firm moist soil as the teeth 12 rotate down into the soil they shove the dirt or soil toward the bottom of the furrow and against the seed as is best shown in FIG. 5. The teeth 12 as they rotate upward and out of the soil loosen the soil area above and to the side of the seed essentially destroying the compaction of the side walls of the furrow, as shown in FIG. 5. In loose soil or dry soil the teeth penetrate the soil easily and as they rotate downward they compact the soil and push it in toward the seed as previously described. The teeth also breakup clods and as the teeth rotate upward in loose soil they permit the finer soil to fall down into the area of the void created by the teeth passing through the soil. This will tend to eliminate air pockets by having the smaller finer soil particles at the bottom of the trench and firmed against the seed by the next tooth 12. The larger particles of soil will be lifted to the surface where they act as mulching material.

The closing wheels 11 with the teeth 12 act to stabilize the planter unit at the rear because of the firm positioning of the teeth in the soil. This prevents the slipping which occurs with round wheels toward the furrow or seed trench especially on a side hill toward the center of the seed trench on one side and away from the seed trench on the other which results in an unacceptable closure. The novel closing device of this invention with its sharp toothed closing wheels will maintain a consistent closing action and remain centered about the seed furrow under adverse conditions.

The trailing press wheel 18 designed to roll inside the circumference of the closing wheels 11, also has pointed and sharpened teeth 19 to capture the soil that has been spaded up or loosened by the closing wheels 11. Trailing press wheel 18 is also made of heavy steel and may be adjusted upwardly and downwardly by an adjustable mechanism 16. This adjustment regulates the depth and amount of loose soil which is compacted or tamped by the press wheel 18. This variable depth of press wheel 18 will be determined by the type of soil and the planting conditions. If the soil is loose and relatively dry the press wheel 18 will be set at its maximum depth of penetration. When the soil is wet the press wheel 18 will be raised completely because there is no tamping or compaction of the soil loosened by the closing wheels required. The press wheel 18 by having a plurality of teeth 19 provides for an intermittent compacting or firming of the furrow top. The space between the teeth remains uncompacted so that each seed has an easy exit point nearby. When the press wheel is set at it's maximum depth of penetration, the area beneath each tooth is tightly tamped to hold moisture.

Having described the preferred embodiment, other features of the present invention will undoubtedly occur to those versed in the art, as will numerous modifications and alterations in the embodiments of the invention illustrated, all of which may be achieved without departing from the spirit and scope of the invention as defined in the appending claims.

I claim:

1. In a planting assembly having a furrow forming mechanism, a seed dispensing mechanism for placing seeds in the furrow formed by said furrow forming mechanism, a structure for creating seed soil contact and conditioning the soil for seed germination and emergence comprising:

support structure attached to said planting assembly;

a plurality of wheels having a plurality of teeth on the periphery thereof attached to said support structure rearwardly of said seed dispensing mechanism, and located to the sides of said furrow;

said teeth having sharpened faces to positively penetrate the soil as the wheels rotate;

said wheels attached to said support structure at an angle to the vertical; and means connected between said support structure and said planting assembly for forcing said teeth of said wheels into the soil to condition the soil and establish positive seed soil contact.

2. The invention in accordance with claim 1 wherein said sharpened faces are sloped with respect to the periphery at an angle to the direction of travel.

3. The invention in accordance with claim 2 wherein said angle of slope is 45°.

4. The invention in accordance with claim 1 wherein said wheels are attached at an angle of 20° to the vertical.

5. The invention in accordance with claim 1 wherein the force of said means for forcing said wheel into said soil is adjustable within predetermined limits.

6. The invention in accordance with claim 5 wherein said adjustable force means is a spring.

7. The invention in accordance with claim 5 wherein said adjustable force is sufficient to force the teeth of said wheel to be at the seed depth in the furrow.

8. The invention in accordance with claim 7 wherein said maximum depth of pentration of the teeth is 2½ inches.

9. The invention in accordance with claim 2 wherein there are 14 teeth on said periphery of said wheel; each of said teeth 2½ inches long.

10. In a planting assembly having a furrow forming mechanism, a seed dispensing mechanism for placing seeds in the furrow formed by said furrow forming mechanism and structure for conditioning the soil around and above the seed to maximize emergence comprising:

support structure attached to said planting assembly;

a wheel having a plurality of teeth attached to said planting assembly rearwardly of said seed placing mechanism and centered on the furrow created and containing the seed;

said wheel mounted vertically with relation to said furrow;

means attached between said support structure and said planting assembly for forcing said teeth into the soil; and said teeth having a sharpened face for positively penetrating the soil as the wheel rotates to condition the soil and establish positive seed soil contact.

11. The invention in accordance with claim 10 wherein which said teeth and said spacing between said teeth establish predetermined and intermittent areas of variable compaction of the soil for proper seed soil emergence.

12. The invention in accordance with claim 10 wherein the sharpened faces of said teeth are sloped at 45° to the periphery.

13. The invention in accordance with claim 12 where said teeth have a maximum length of 1¼ inches.

14. The invention in accordance with claim 10 wherein the means for forcing said wheel into said soil is adjustable within predetermined limits.

15. The invention in accordance with claim 14 wherein said adjustable force is a spring.

16. In a planting assembly having a furrow opening mechanism, a seed dispensing mechanism for placing seeds in the furrow and structure for conditioning the soil around the seed to maximize emergence comprising:

support structure attached to said planting assembly;

a plurality of wheels having a plurality of teeth on the periphery thereof attached to said support structure rearwardly of said seed placing mechanisms;

said teeth having sharpened faces to positively penetrate the soil as the wheels rotate;

at least of some said wheels attached to said support structure at an angle to the vertical;

at least of one of said wheels attached to the support structure vertically; and means attached between said support structure and said planting assembly for forcing said wheels to positively penetrate the soil to condition the soil and establish positive seed soil contact.

17. The invention in accordance with claim 16 wherein said means to force said wheels to positively penetrate the soil is adjustable and the means to adjust the force on the vertically positioned wheel is separate and controlled from the adjustable force forcing the side angled wheels into the soil.

\* \* \* \* \*